J. SCHERR.
TAP AND VALVE.
APPLICATION FILED JAN. 18, 1911.
1,089,160.
Patented Mar. 3, 1914.
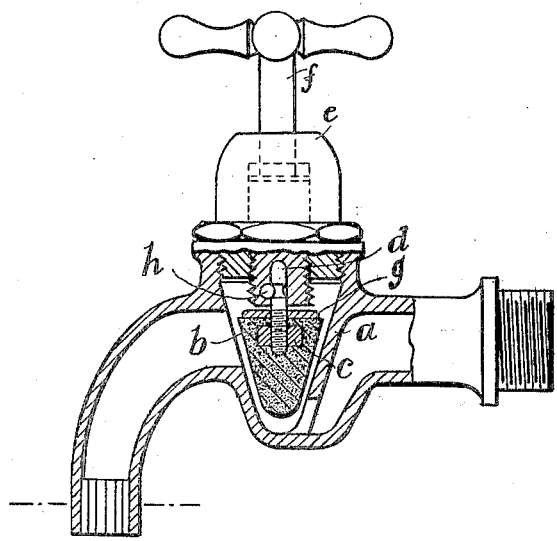

UNITED STATES PATENT OFFICE.

JEAN SCHERR, OF EHRENFELD, COLOGNE, GERMANY.

TAP AND VALVE.

1,089,160.  Specification of Letters Patent.  Patented Mar. 3, 1914.

Application filed January 18, 1911. Serial No. 603,340.

*To all whom it may concern:*

Be it known that I, JEAN SCHERR, a subject of the German Emperor, residing at Ehrenfeld, Cologne, Germany, have invented new and useful Improvements in Taps and Valves, of which the following is a specification.

This invention has reference to improvements in taps and valves and it consists essentially in improved closing means for screw-down and like taps or valves. Such valves have heretofore been usually formed with specially ground valve seatings, or provided with leather or rubber washers to make them water-tight and, as is well known, it is very difficult to keep them from leaking.

In accordance with the present invention the closing means consist of a solid cone of rubber, leather or like compressible and resilient material that fits tight in a correspondingly conical portion of the valve chamber which forms part of the throughway and from which the said throughway is continued laterally through an aperture or apertures formed in the side walls of the said conical portion, the said rubber or like compressible and resilient cone bearing both at its apex and its periphery upon its seat and being thus compressed both axially and radially when the valve spindle is screwed down, so that the said cone requires but slight pressure to make a perfectly tight closure. Conical or tapered plugs for closing the throughway of taps or valves are well known *per se* but, so far as I am aware, all the known compressible plugs have a rigid core—usually in the form of a metal rod that passes centrally through the cone from base to apex and on which the compressible material is held between a fixed collar and a threaded nut.

I have illustrated my invention in the accompanying drawing, which shows an elevation, partly in section, of a water tap constructed in accordance with the invention.

Referring to the drawing, the valve chamber $a$ is formed with a downwardly extending conical portion forming part of the throughway, in which a solid cone $b$ of rubber, leather or like compressible and resilient material fits. The cone $b$ is carried by the valve spindle in such a manner that it has no tendency to rotate therewith when it contacts with the casing $a$, and consequently there is practically no tear and wear thereon.

In the cone $b$ I embed a metal nut $c$ into which a stud $d$ is screwed, and the valve spindle $f$ bears upon this stud when it is screwed down. The valve spindle $f$ is formed in the known manner with a screw thread and the stud $d$ carries a metal washer $g$ which transmits the pressure to the whole upper surface of the cone $b$.

The upper end of the stud $d$ is shown as mounted rotatably in a hole bored centrally in the valve spindle and held therein by means of a pin $h$ which passes transversely through the valve spindle and engages in a circumferential groove formed in the stud $d$. This method of coupling a valve to its spindle is well known. In order to obviate the screwed stud $d$ becoming unscrewed from the nut $c$, it may be formed with a left hand thread.

What I claim as my invention and desire to secure by Letters Patent is:—

A valve comprising a valve chamber having a cone-shaped portion forming a part of the through-way and closed at its apex, said valve chamber having an aperture in its side wall which also constitutes part of the through-way, a solid cone of compressible and resilient material located within and having a shape to fit the cone-shaped portion of the valve chamber, a screw-threaded valve spindle provided with a handle, and a swivel connection between said cone and the valve spindle, the construction being such that when the spindle is turned the cone is carried into said cone-shaped portion with the end of the cone engaging the closed apex of the said cone-shaped portion, whereby the said cone will be compressed axially and thereby expanded radially to make a tight fit in said cone-shaped portion.

In testimony whereof I have signed my name to this specification in the presence of two subscribing witnesses.

JEAN SCHERR.

Witnesses:
 ANTON BOECKLING,
 LOUIS VANDORY.